United States Patent
Rao

(10) Patent No.: US 9,122,603 B2
(45) Date of Patent: Sep. 1, 2015

(54) FAILURE DETECTION IN HIGH-PERFORMANCE CLUSTERS AND COMPUTERS USING CHAOTIC MAP COMPUTATIONS

(71) Applicant: UT-Battelle, LLC, Oak Ridge, TN (US)

(72) Inventor: Nageswara S. Rao, Oak Ridge, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 204 days.

(21) Appl. No.: 13/919,601

(22) Filed: Jun. 17, 2013

(65) Prior Publication Data

US 2014/0372802 A1    Dec. 18, 2014

(51) Int. Cl.
| | |
|---|---|
| G06F 11/00 | (2006.01) |
| G06F 11/07 | (2006.01) |
| G06F 11/34 | (2006.01) |
| G06F 11/30 | (2006.01) |

(52) U.S. Cl.
CPC .......... *G06F 11/079* (2013.01); *G06F 11/0709* (2013.01); *G06F 11/3006* (2013.01); *G06F 11/3447* (2013.01)

(58) Field of Classification Search
CPC .............. G06F 11/079; G06F 11/0709; G06F 11/0715; G06F 11/30; G06F 11/3006; G06F 11/3017; G06F 11/3048; G06F 11/32; G06F 11/322; G06F 11/323; G06F 11/3404; G06F 11/3442; G06F 11/3447; G06F 11/3452; G06F 11/3466
USPC ........... 714/37, 10, 11, 25, 30, 31, 33, 35, 43, 714/47.1, 48
See application file for complete search history.

(56) References Cited

U.S. PATENT DOCUMENTS

| | | | | |
|---|---|---|---|---|
| 6,396,575 | B1* | 5/2002 | Holland | 356/73.1 |
| 7,301,296 | B1* | 11/2007 | Discenzo | 318/400.04 |
| 2009/0083014 | A1* | 3/2009 | Schallert | 703/6 |
| 2014/0006870 | A1* | 1/2014 | Fryman et al. | 714/37 |

OTHER PUBLICATIONS

Alligood, K.T., et al., "Chaos: An Introduction to Dynamical Systems," CH 2.1 Mathematical Models, Springer-Verlag, 1996, pp. 49-50, 479.

Avizienis, A. et al., "Basic Concepts and Taxonomy of Dependable and Secure Computing," IEEE Transactions on Dependable and Secure Computing, vol. 1, No. 1, Jan.-Mar. 2004, pp. 11-33.

(Continued)

*Primary Examiner* — Joseph D Manoskey
(74) *Attorney, Agent, or Firm* — Brinks Gilson & Lione

(57) ABSTRACT

A programmable media includes a processing unit capable of independent operation in a machine that is capable of executing $10^{18}$ floating point operations per second. The processing unit is in communication with a memory element and an interconnect that couples computing nodes. The programmable media includes a logical unit configured to execute arithmetic functions, comparative functions, and/or logical functions. The processing unit is configured to detect computing component failures, memory element failures and/or interconnect failures by executing programming threads that generate one or more chaotic map trajectories. The central processing unit or graphical processing unit is configured to detect a computing component failure, memory element failure and/or an interconnect failure through an automated comparison of signal trajectories generated by the chaotic maps.

19 Claims, 13 Drawing Sheets

(56) References Cited

OTHER PUBLICATIONS

Berkeley Lab Checkpoint/Restart (BLCR) for LINUX, last edited Nov. 7, 2014, printed from the internet at <http://ftg.lbl.gov/CheckpointRestart/CheckpointRestart.shtml> on Jun. 3, 2015, 3 pages.
Blum, M. et al., "Designing Programs that Check Their Work," Journal of the Association for Computing Machinery, vol. 42, No. 1, 1995, pp. 269-291.
Cappello, F. et al., "Towards Exascale Resilience," The International Journal of High Performance Computing Applications, vol. 23, No. 4, 2009, pp. 374-388.
Chakravorty, S., et al., "Proactive Fault Tolerance in MPI Applications via Task Migration," Department of Computer Science, University of Illinois at Urbana-Champaign, pp. 1-12.
Devroye, L., "A Probabilistic Theory of Pattern Recognition," CH 8.2 Hoeffdings Inquality, Springer-Verlag, 1996, pp. 122-124.
Dongarra, J. et al., "The International Exascale Software Roadmap," The International Journal of High Performance Computer Applications, vol. 25, No. 1, 2011, pp. 2-60.
Engelman, C. et al., "Super-Scalable Algorithms for Computing on 100,000 Processors," International Conference on Computational Science, 2005, pp. 1-18, <http://icl.cs.utk.edu/ftmpi/>.
Gao, J. et al., "Multiscale Analysis of Complex Time Series," CH 14 Power-Law Sensitivity to Initial Conditions (PSIC), John Wiley, 2007, pp. 261-269.
Gao, J. et al., "Quasiperiodic Route to Chaos in the Dynamics of Internet Transport Protocols," Physical Review Letters, PRL 94, 2005, pp. 198702 1-4.
Goloubeva, O. et al., *Software—Implemented Fault Tolerance*, Springer-Verlag, 2006, 238 pages.
International Exascale Software Project, printed from the internet at <www.exascale.org> on Jun. 3, 2015, 7 pages.
Parker, T.S. et al., "Chaos: A Tutorial for Engineers," Proceedings of the IEEE, vol. 75, No. 8, 1987, pp. 982-1008.
Pippenger, N., Developments in "The Synthesis of Reliable Organisms from Unreliable Components," Proceedings of Symposium in Pure Mathematics, vol. 50, 1990, pp. 311-324.
Rao, N. S. V., Computational Complexity Issues in Operative Diagnosis of Graph-Based Systems. IEEE Transactions on Computers, vol. 42, No. 4, 1993, pp. 447-457.
Rao, N. S. V. et al., "On Dynamics of Transport Protocols Over Wide-Area Internet Connections," Springer-Verlag, 2005, pp. 69-101.
Rao, N. S. V. et al., "On Polynomial-Time Testable Combinational Circuits," IEEE Transactions on Computers, vol. 43, No. 11, 1994, pp. 1298-1308.
Rennels, D., "Fault-Tolerant Computing," Encyclopedia of Computer Science, International Thomson Publishing, 1999, pp. 698-702.
Schlichting, R. D., et al., "Fail-Stop Processors: An Approach to Designing Fault-Tolerant Computing Systems," ACM Transactions on Computer Systems, vol. 1, No. 3, 1983, pp. 222-238.
Shirvani, P.P. et al., "Software-Implemented Hardware Fault Tolerance Experiments: COTS in Space", In Proceedings of the International Conference on Dependable Systems and Networks, 2000, pp. 56-57.
Von Neumann, J., Probabilistic Logics and the Synthesis of Reliable Organisms From Unreliable Components, Automata Studies, Princeton University Press, Ed. C. Shannon, 1956, pp. 43-98.
Wang, C. et al., "Proactive Process-Level Live Migration in HPC Environments," in Proceeding of Supercomputing, 2008, pp. 1-12.
Wiggins, S., "Introduction to Applied Nonlinear Dynamical Systems and Chaos," CH 1.2 Poincare Maps: Theory, Construction, and Examples, Springer-Verlag, 1990, pp. 64-89.

\* cited by examiner

FAILURE DETECTION IN HIGH-PERFORMANCE CLUSTERS AND COMPUTERS USING CHAOTIC MAP COMPUTATIONS

STATEMENT REGARDING FEDERALLY SPONSORED RESEARCH AND DEVELOPMENT

This invention was made with United States government support under Contract No. DE-AC05-00OR22725 awarded to Oak Ridge National Laboratory by the United States Department of Energy. The United States government has certain rights in the invention.

BACKGROUND

1. Technical Field

This disclosure relates to failure detection and more particularly to fault detection of computing machines that utilize multiple processor cores and accelerators.

2. Related Art

The task of detecting processor faults is complicated and increases in complexity as processors are added to computing systems. As more processors are added, more sockets, layers of memory, memory buses, HyperTransport (HT) links, and other components are needed. Due to the complexities of these architectures and the large number of components, the systems may fail in many ways including when Arithmetic and Logic Units (ALUs), memory elements, transport components, etc. fail. Some failures are difficult to detect at the node and the board level, and consequently do not allow for corrective measures such as check point recovery or process migration, when failures occur. As a result, computations may run until they are completed with little or no indication that a fault has occurred.

Such results may be observed in some high performance systems, such as supercomputers and large compute clusters. When software is executed repeatedly, faults can negatively influence the results, leading to different outputs for the same input. Repeated execution of existing application codes with known outputs for diagnosis purposes can require significant execution times and is not always capable of detecting many errors, including errors at the board or node level.

DETAILED DESCRIPTION OF THE PREFERRED EMBODIMENTS

This disclosure discloses technology that rapidly diagnoses faults in multi-processor machines, such as high-performance clusters and supercomputers. Through the execution of multiple concurrent threads and memory transfer operations, the failure detection systems and processes (referred to as systems or failure detection systems) detect a wide class of errors including errors caused by failures in one or more processors, one or more memory elements, and one or more interconnections. The failure detection systems use dedicated threads to execute chaotic map computations and in some applications, execute memory sweeps and global-local memory movements from node-to-node. The chaotic map threads generate identical state (or nearly identical) trajectories when there are no faults. Under failures they generate divergent trajectories through multiple processor cores, memory elements, and/or interconnects in time and state within a few software code iterations that may be detected through an automated comparison or difference calculation of those output trajectories. The memory sweeps may diagnose local memory elements and/or bus failures. The global-local memory movements may diagnose hierarchical memory element failures, data and control path failures, and inter-processor and/or inter-component failures.

Figure 1:
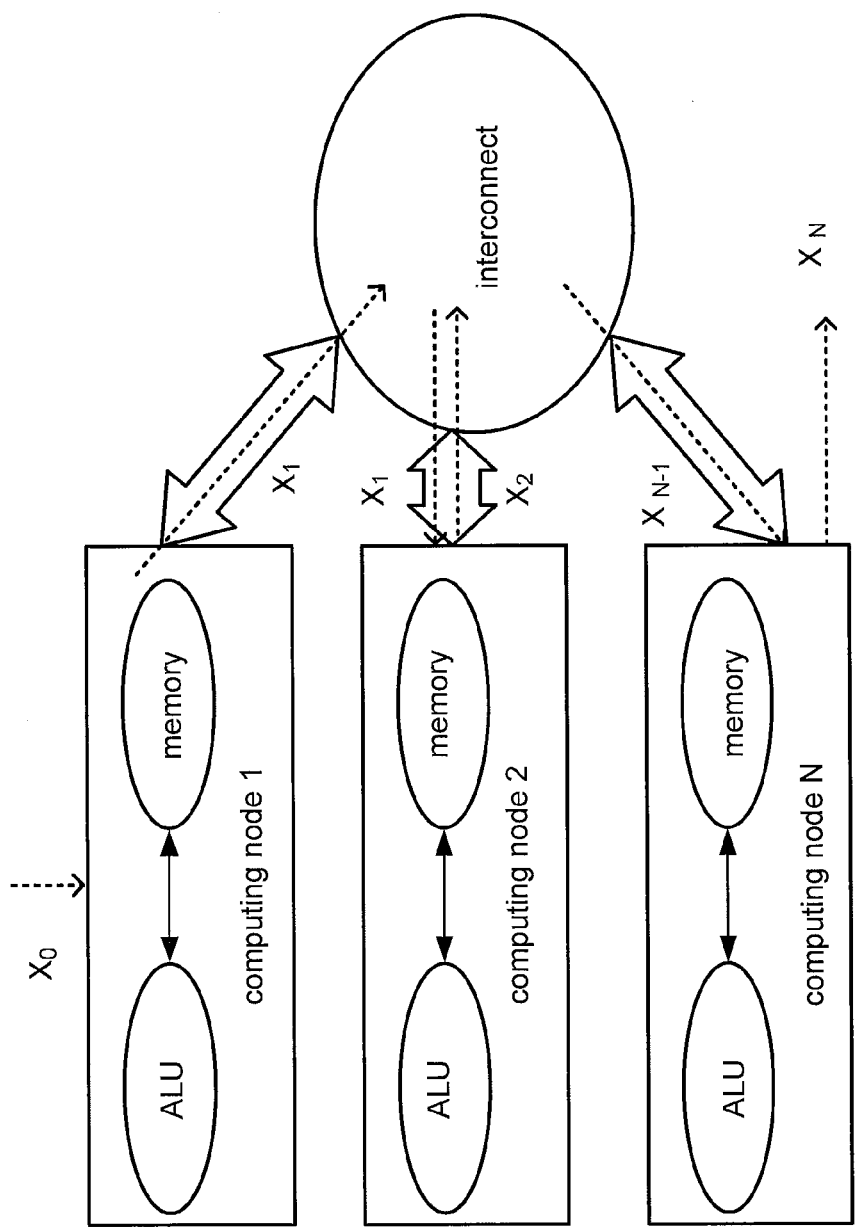
FIG. 1 is a block diagram of an exemplary architecture of processing nodes connected to an interconnect.
Figure 2:
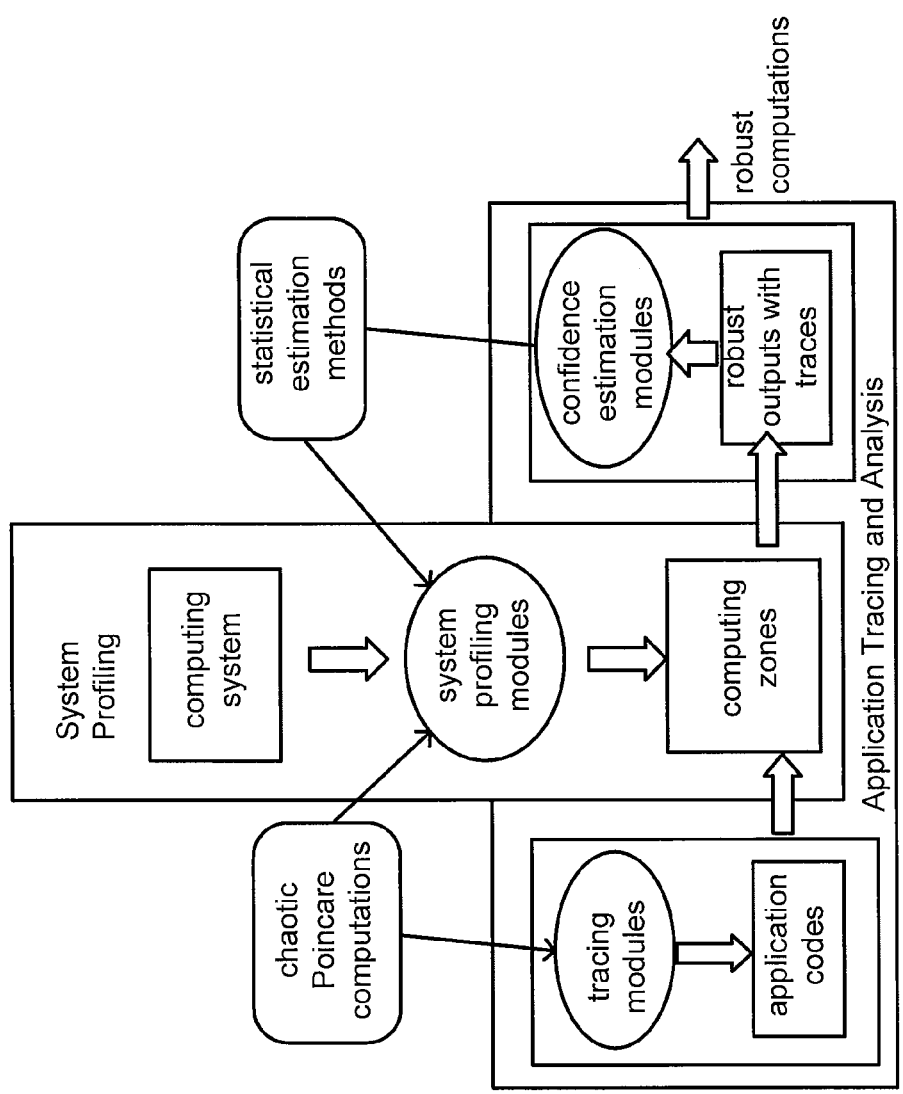
FIG. 2 is a functional diagram of system profiling and application tracing.

FIG. 2 illustrates a framework of one of the failure detection systems. It includes software (e.g., modules or routines and data structures that perform mapping tasks and data transfers in time) that executes diagnosis and profiling that may interface an optional application tracing. The system diagnosing and profiling software within the failure detection system may be executed initially to generate an operational profile of a computer, which may comprise computing nodes and interconnects shown in FIG. 1 (referred herein after as a computer or machine) that may be part of an exascale machine (e.g., computing systems capable of at least one exaFLOPS or $10^{18}$ FLoating-point Operations Per Second—FLOPS). In some applications, substantially all of the computer's resources are utilized to build an initial operational profile, which are subsequently reallocated as needed. In some failure detection systems the diagnosis modules concurrently execute maps that are customized to isolate static and silent failures in the processing nodes, memory, and processor or board interconnects. A statistical failure profile may determine the number of components likely to fail in a predetermined time period, such as during each operational hour or programmable code cycle, for example.

The diagnosis modules may be integrated within or communicate with application software codes in the optional application and tracing analysis component. When integrated into application codes, the failure detection system may track one or more execution paths via tracer codes that trace or follow along the components that execute the application codes. The components may include the processors cores, memory elements, and interconnect links, for example. The frequency and duration that the tracer modules find no errors may be used to derive confidence values of the outputs of the application codes. No detected failures result in higher confidence scores.

Figure 3:
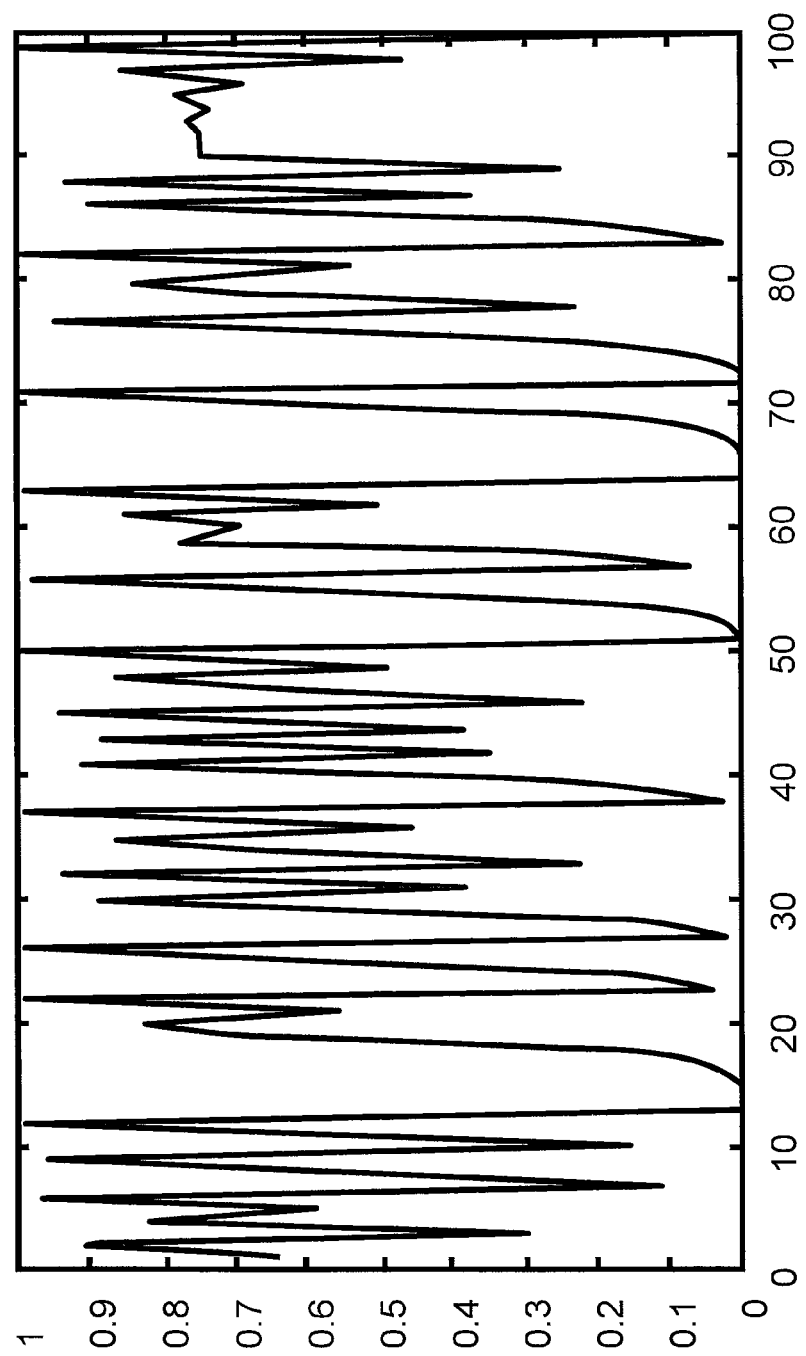
FIG. 3 shows the trajectories of a logistic map with no failures.
Figure 6:
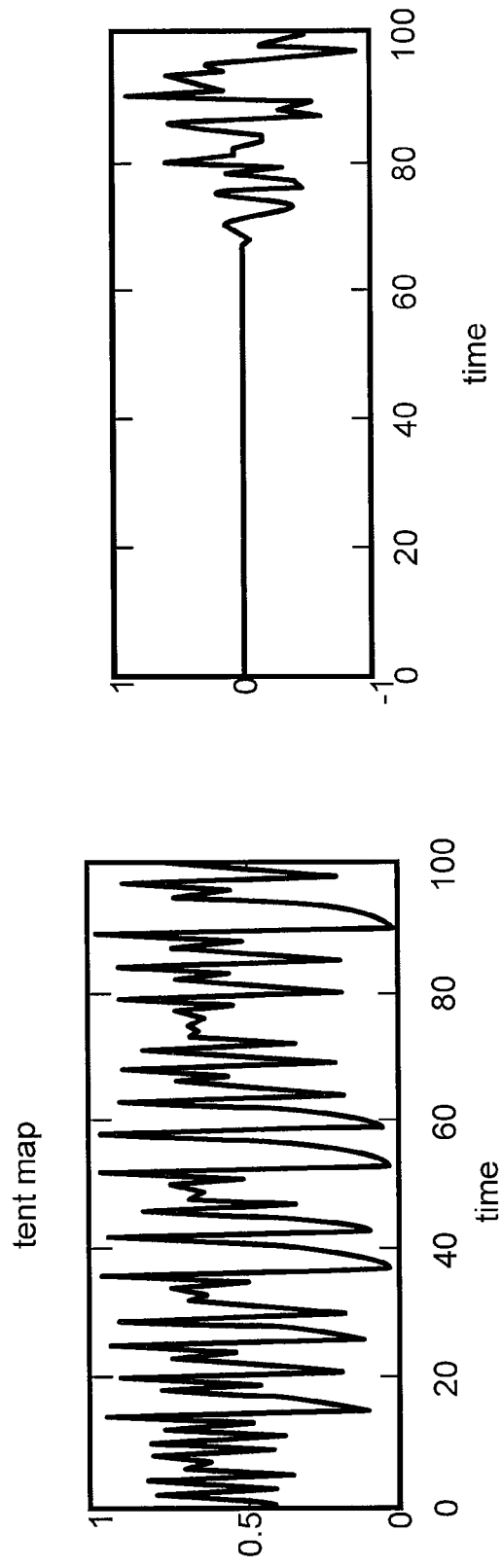
FIG. 6 shows the trajectories of two tent maps where the maps on the left illustrate the error free trajectories and the map on the right show the difference in the trajectories between an error free processor core and the corrupted processor core.
Figure 7:
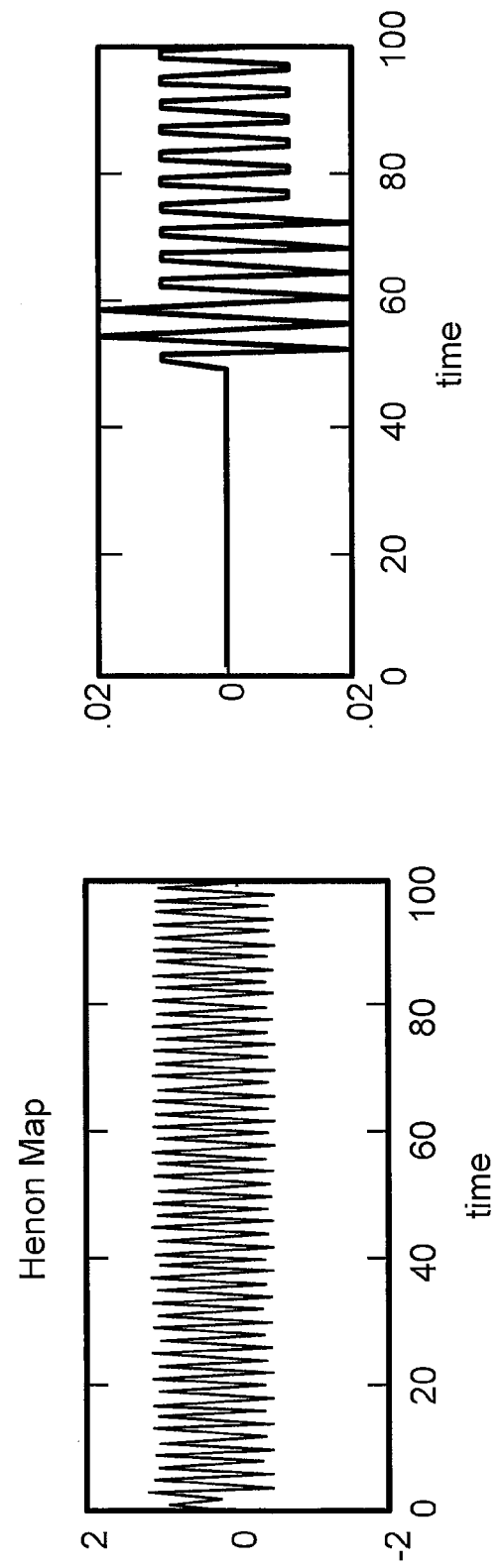
FIG. 7 shows the trajectories of two Henon maps where the maps on the left illustrate the error free trajectories and the map on the right show the difference in the trajectories between an error free processor core and corrupted processor core.

To identify computation errors due to component failures in processors (and their components such as ALUs), memory, and crossconnects such as the exemplary architecture shown in FIG. 1 the failure detection systems execute multiple, concurrent chaotic Poincare maps. The Poincare map $M: \Re^d \to \Re^d$ specifies the trajectory of a real-vector state $X_i \in \Re^d$ that is updated each time step i such that $X_{i+1}=M(X_i)$. In some systems, $M(X_i)$ involves floating point operations, such a multiplication and addition, and can vary significantly in the number and types of operations. The trajectory $X_0; X_1; \ldots; X_i$, such that $X_i=M^i(X_0)$, generated by select Poincare maps can exhibit complex, so called chaotic, profiles. FIGS. 3, 6, and 7 show the trajectories of three maps: (a) logistic map $M_{L_a}(X)=aX(1-X)$ (FIG. 3) (b) tent map $M_T(X)=2X$ if $X \leq \frac{1}{2}$ and $M_T(X)=2(1-X)$, (FIG. 6 on left) and the (c) Henon map $M_H(X,Y)=(a-X^2+bY,X)$ which is two-dimensional (FIG. 7 on left). The logistic map, with update $M_{L_a}(X_i)=aX_i(1-X_i)$ that requires two multiplications and one subtraction, exhibits chaotic dynamics for a=4. The trajectories generated by the Poincare map M are characterized by the Lyapunov Exponent $\mathcal{L}_M$ defined $$\ln\left|\frac{dM}{dX}\right|,$$

which characterizes the separation of the trajectories that originate from the nearby operational states. Chaotic Poincare maps, referred to simply as chaotic maps, are characterized by a positive Lyapunov Exponent.

Figure 4:
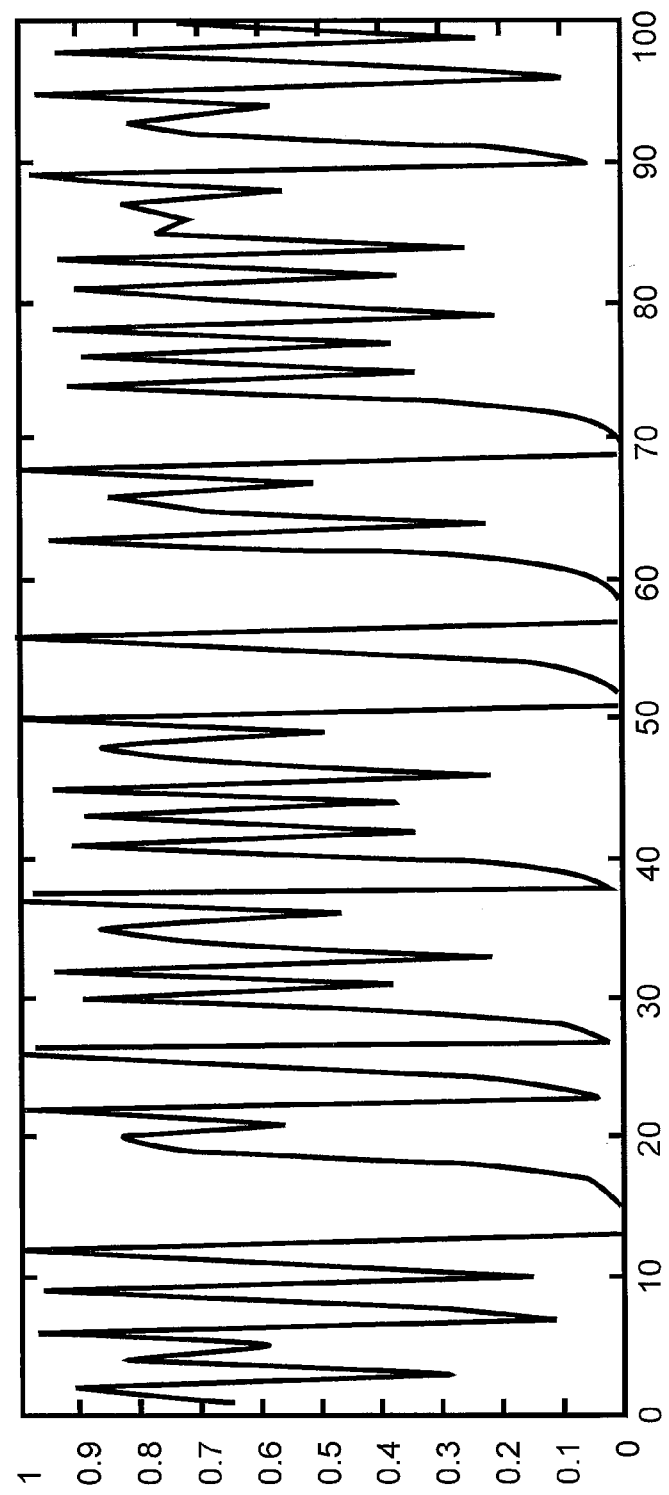
FIG. 4 shows the trajectories of a logistic map with a 0.001 error at iteration 50.
Figure 5:
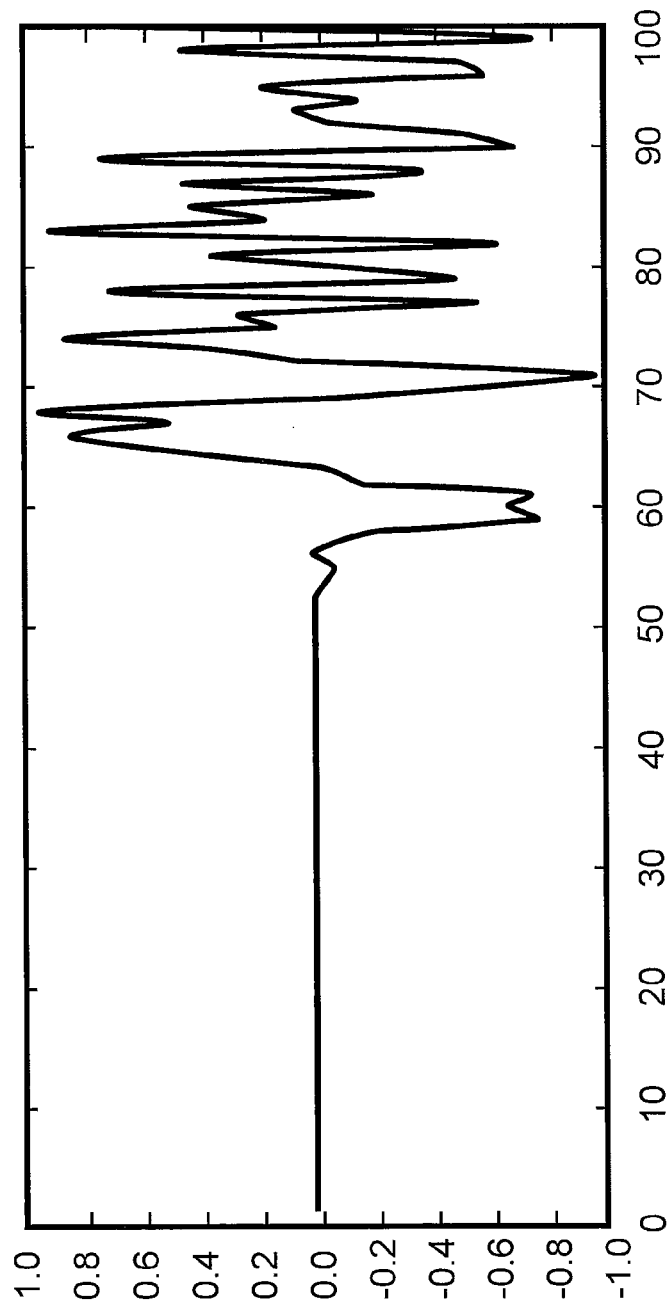
FIG. 5 shows the differences between FIG. 3 and FIG. 4.

The trajectories generated by the chaotic maps exhibit exponential divergence, meaning that trajectories that start from states that are only slightly different from each other rapidly diverge from each other in a few steps when component failures or faults occur. Consider that the same exemplary logistic map M is computed on two identical processor cores starting with $X_0$, and $Xi=M^i(X_0)$ at one of them becomes corrupted by 0.01 magnitude in iteration 50 as shown in FIG. 4. During iterations 0 through 50, the difference derived between the trajectories is 0 or substantially 0, but the small difference in state magnitude is amplified within 5 iterations after the error occurs as shown in FIG. 5. Similar differences were detected using a tent map and Henon map shown in FIGS. 6 and 7, respectively, where the maps on the left of these figures illustrate the error free trajectories and the map on the right show the difference in the trajectories between an error free processor core and a processor core that became corrupted by 0.01 magnitude at iteration 50. During steps 0 through 50, the difference between the trajectories is substantially 0, but the small difference in state magnitude is amplified within a few iterations. In this example, the detection based on a 0.01 magnitude test was achieved in 19, 23 and 2 steps for the logistic, tent, and Henon maps, respectively.

Such divergence in trajectories may be detected by calculating a difference in magnitude (e.g., amplitude of the states) through one or more central processors, graphic processors, etc., that compare or subtract the magnitude of the respective trajectories in time. In alternative failure detection systems, reference trajectory data or signals may be pre-computed via a failure-free execution and stored in a local or remote memory or database accessible to the central processor(s)/graphic processor(s). The dynamically computed trajectory data/signals may be compared to or subtracted from the pre-computed trajectories to detect and identify errors, which occur in time and represent a difference in state. The comparison or difference may compensate or may have to account for the floating point precisions achieved by different computing units/nodes.

Figure 8:
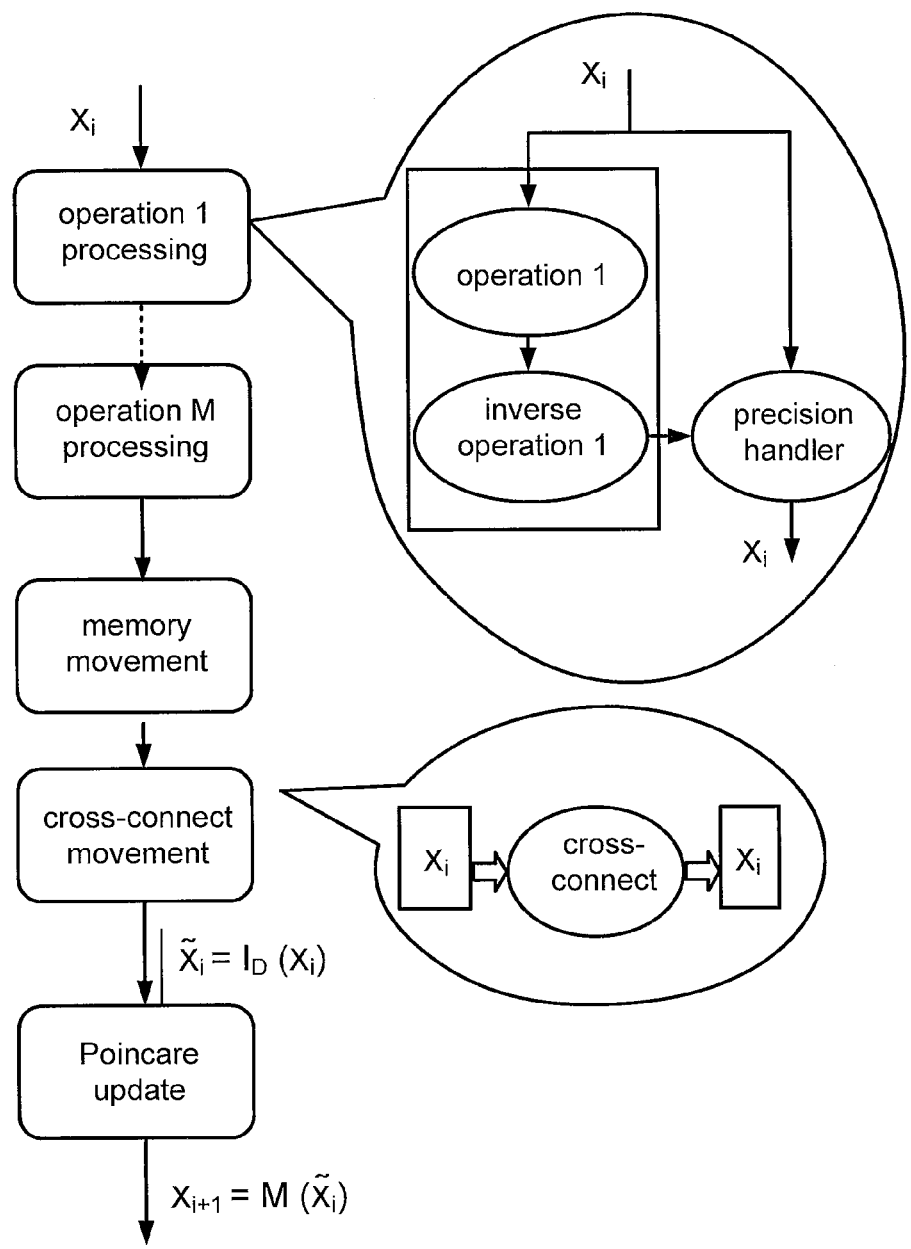
FIG. 8 is a flow chart of an identity map augmenting a Poincare map.

To account for errors in the execution paths of the computing nodes, interconnects, and other portions of the computer, some fault detection systems route chaotic identity maps (CI-maps or Poincare Chaotic-Identity maps) through different computing operations, memory locations, and interconnect links to capture errors. If its output $\tilde{X}_i=I_D(X_i)$ is identical or substantially identical to $X_i$, the fault detect system detects no faults. As shown in FIG. 8, some failure detection systems compute operations and their inverse operations. The selection of these operation inverse pairs (e.g., multiplication and division; addition and subtraction, exponent and logarithm, etc.) are made based on the instruction sets of the computing nodes (e.g., central processor unit CPU, graphical processor unit GPU, etc.) to complement the floating point operations used by the chaotic map itself, and also the availability of the corresponding inverse operations. The application of a pair of these operations gives back the original operand $X_i$, and an error in either of operation will lead to a difference in the state estimates that would be amplified by the subsequent mapping update executed by the fault detection system. However, for floating point operations, the recovered operand may not be identical to the original due to the precision limits; this is particularly true for computations on two different types of computing nodes such as nodes that comprise a traditional CPU and/or a GPU. For example, for pairs such as addition and subtraction, the resultant operand might have no errors, but for the multiplication and division pair, the result is only assured to be within a precision limit; such difference may be amplified by the fault detect systems' execution of the chaotic map and trigger the failure detection threshold.

As further shown in FIG. 8, some failure detection systems transmit state variable $X_i$ among the memory elements and/or across the interconnects before applying $M(:)$, to capture the errors in the memory and the transmission across the interconnects. The memory-to-memory transfers may be achieved by supported operations in some applications, ranging from employing additional variables in the "shared" memory to utilizing explicit Message Passing Interface (MPI) calls. For the application tracing, the movements may reflect the execution paths of the application since the tracer codes are called from within them.

To diagnose multi-processor computers using Chaotic Identity maps (CI-maps), a CI-map is computed as denoted by $X_{i+1} \leftarrow_{L_{jk}} I_{D:P_j}(X_i)$, where $I_{D:P_j}(X_i)$ is computed on the computing node $P_j$ and the output (i, Xi) is transmitted to the computing node $P_k$. In a limiting case of no node-to-node communications, all computations are carried out in-place at the same processing node $P_s$ such that $p=\{P_s\}$. For two different processing nodes, $P_{s1}$ and $P_{s2}$, the outputs are identical if no fault occurs in either. However, a fault in one will lead to quick divergence of the outputs, which detected by the failure detection system's CI-map in a few iterations based on the Lyapunov exponent of $M(.)$. Even when an error is solely due to the communications, the outputs of $[n,X_0,X_n]p$ and $[n,X_0,X_n]_{\{P_s\}}$ diverge, and are differentiated and identified by the failure detection systems.

The software that is executed by the fault detection systems generates a Poincare Computing and Communication chain (PCC-chain) by utilizing computations at a set of n processing nodes $p=\{P_0,P_1,\ldots P_{n-1}\}$ connected over the interconnects such that $I_{D:P_i}(X_i)$ is computed on $P_i$ and transmitted to $P_{i+1}$ over an interconnect link. The output of this chain $(n,M^i_{P_{n-1}}(X_{n-1}))_p$ is computed in time $n(T_M+T_I)$, where $T_M$ and $T_I$ corresponds to the cost of computing $I_D(.)$ once and communicating over the interconnect, respectively.

Figure 9:
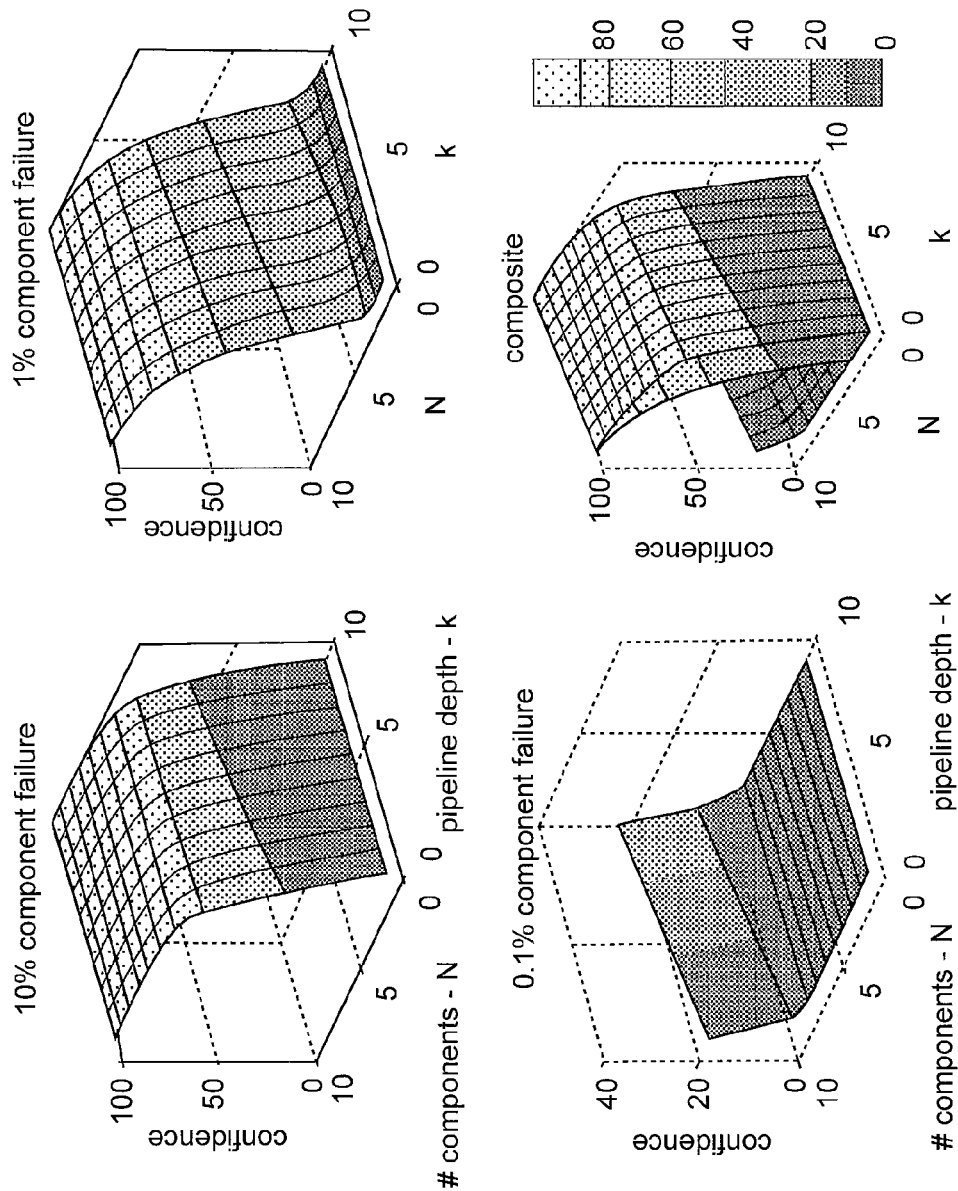
FIG. 9 shows confidence estimates based on no failures.

The Pipelined Chains of Chaotic PCC maps (PCC$^2$-map) are generated through PCC-chains such that $I_{D:P_i}(|X^k_{i+k}|)$ of k-th chain is computed on $P_i$ at time i+k and sent to $P_{i+1}$ over the interconnect link through the execution of the mapping software. Thus, this map is computed in time $(n+k)(T_M+T_I)$. By applying the approach described above to the pipeline of k PCC-chains, renders $$P\{P_{TC} > a\} < 2e^{-2[1-(1-a)^{N+k}-\hat{P}_{TC}]^2 N_P}$$

where $P_{TC}$ corresponds to the failure of any of the components including ALU, memory and interconnect, and $\hat{P}_{TC}$ is its empirical estimate. Examples with k=10 and N=10 for a=0: 001; 0:01; 0:1 and $\hat{P}_E$=0, are plotted in FIG. 9, which shows higher confidence for deeper pipelines and a larger number of components; also the confidence profiles as a whole are higher as a is reduced. Some pipelines chains are computationally intensive and are used in the initial system profiling, and are invoked regularly on a schedule or asynchronously, or on on-demand (e.g., in response to an application program call) to incrementally maintain the multicore system and maintain its operational profile. A pipeline with $n_p$ chains and periodicity $T_p$ uses $n_P$ consecutive nodes within every block of $T_p$ nodes, and the chains sweep across all N nodes; for a full pipeline $n_P=T_p$.

FIGS. 10-13 illustrate the detection of failures of the processing nodes connected to interconnect shown in the exemplary architecture of FIG. 1. The errors detected include: (i) ALU errors corrupted the state by a multiplier, (ii) memory errors clamp the state to a fixed value, and (iii) cross-connect errors modify the state by a multiplier. The nodes transition to a faulty node with probability p, and once transitioned, the errors of type (i) and (ii) are permanent, whereas error (iii) lasts for a single programming step in time.

Figure 10:
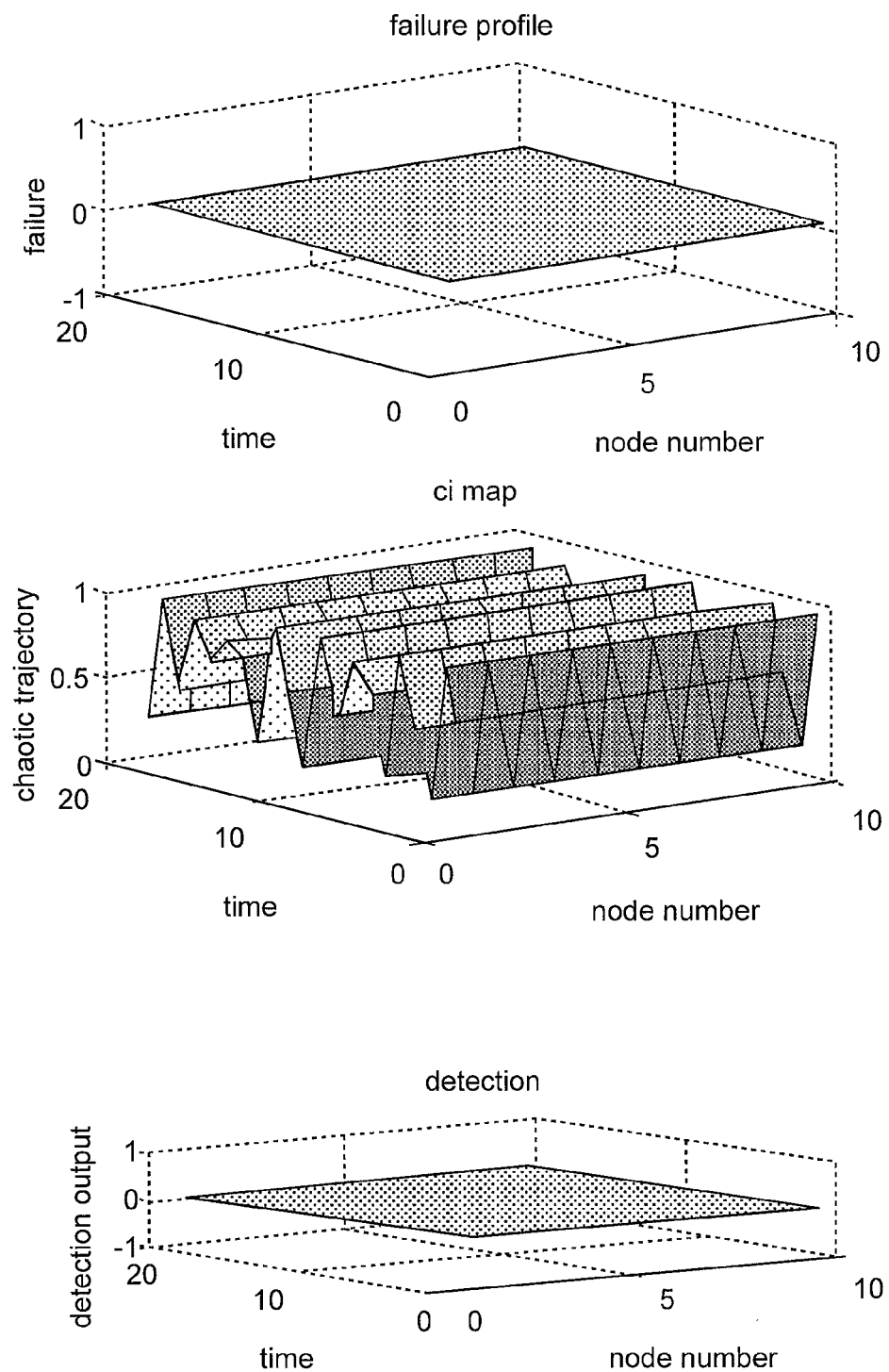
FIG. 10 shows the detection of no failures in a pipeline.
Figure 11:
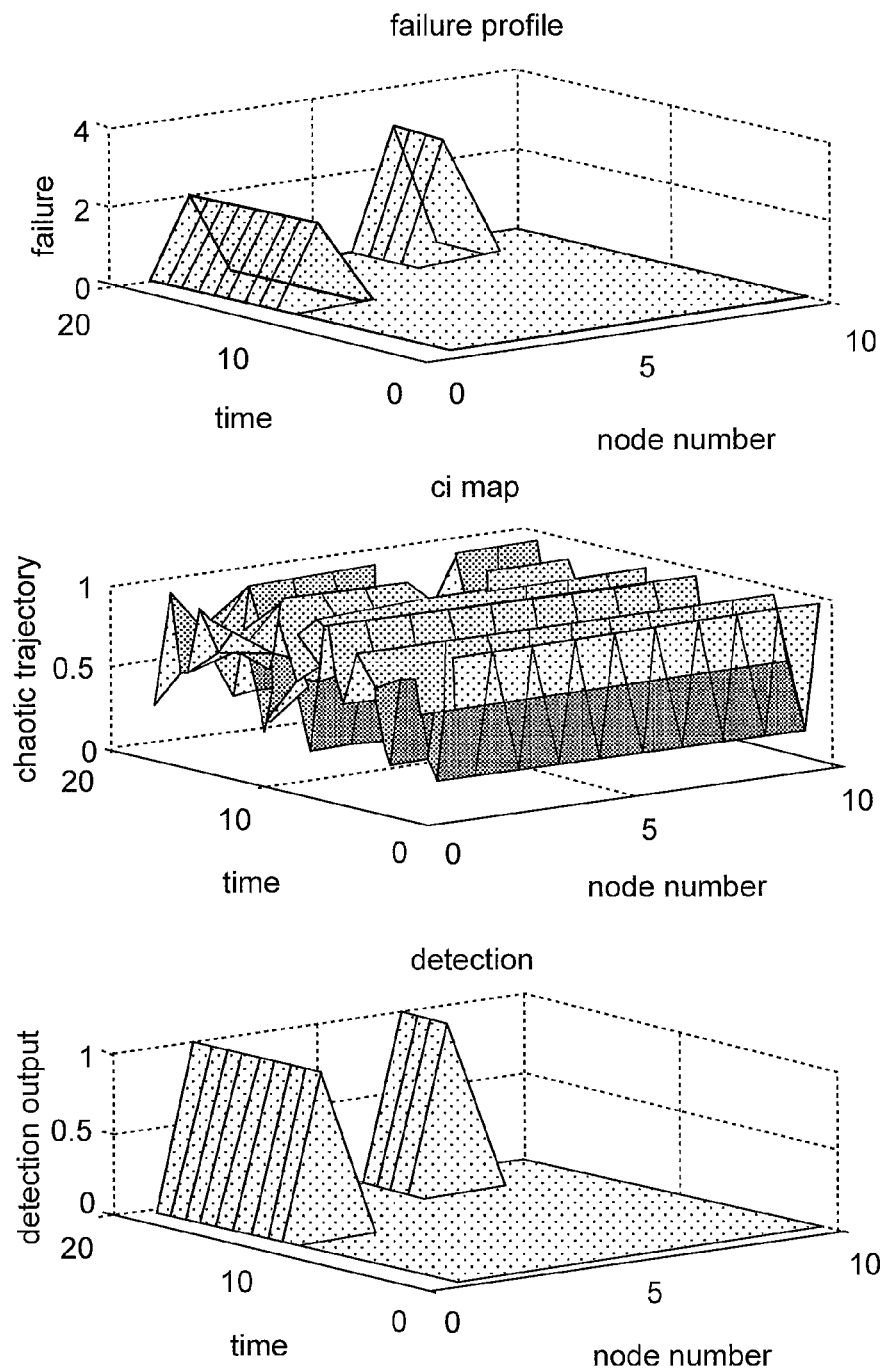
FIG. 11 shows a full pipeline of stuck-at failures.
Figure 12:
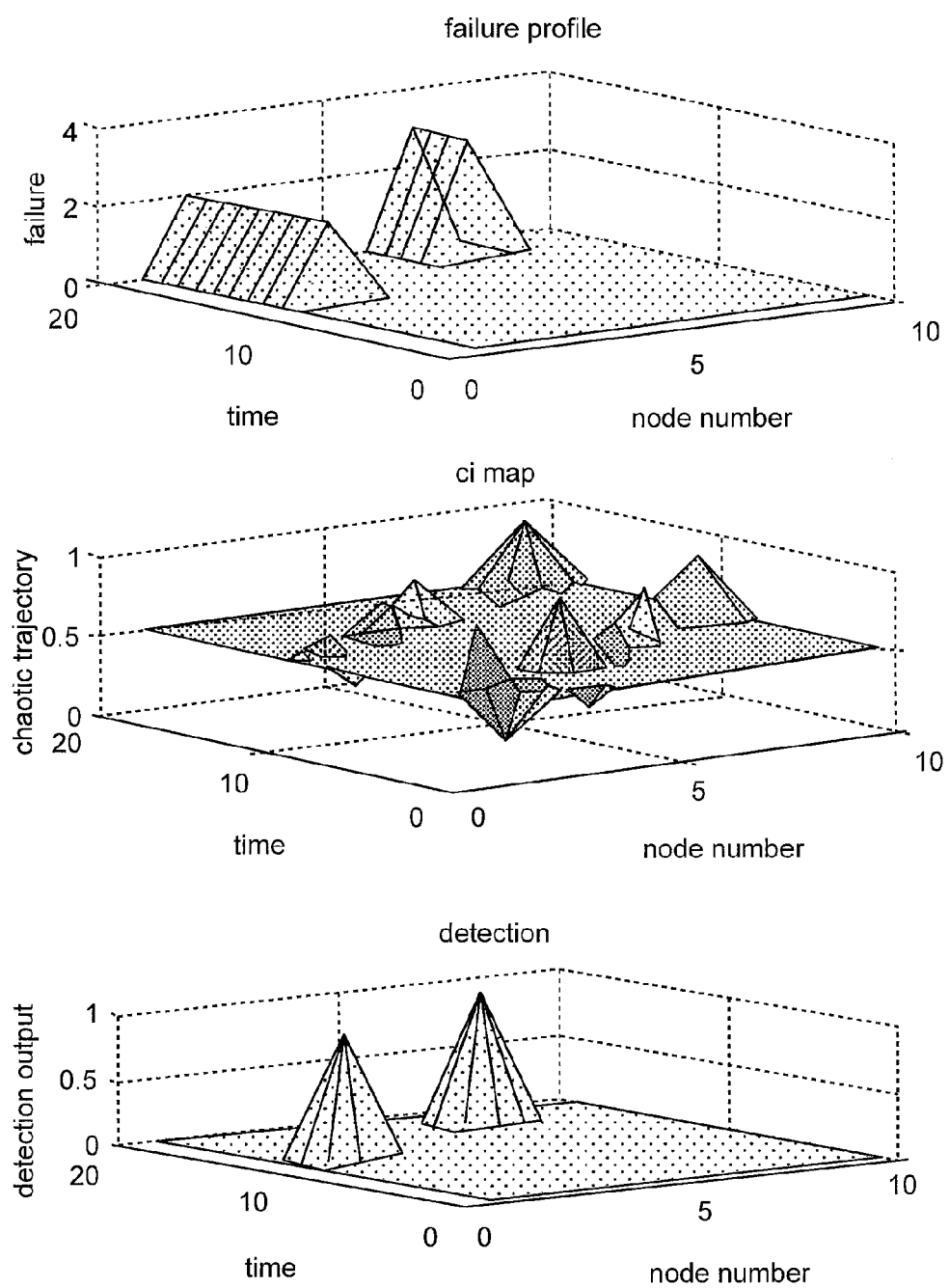
FIG. 12 shows a sparse pipeline that has stuck-at failures.
Figure 13:
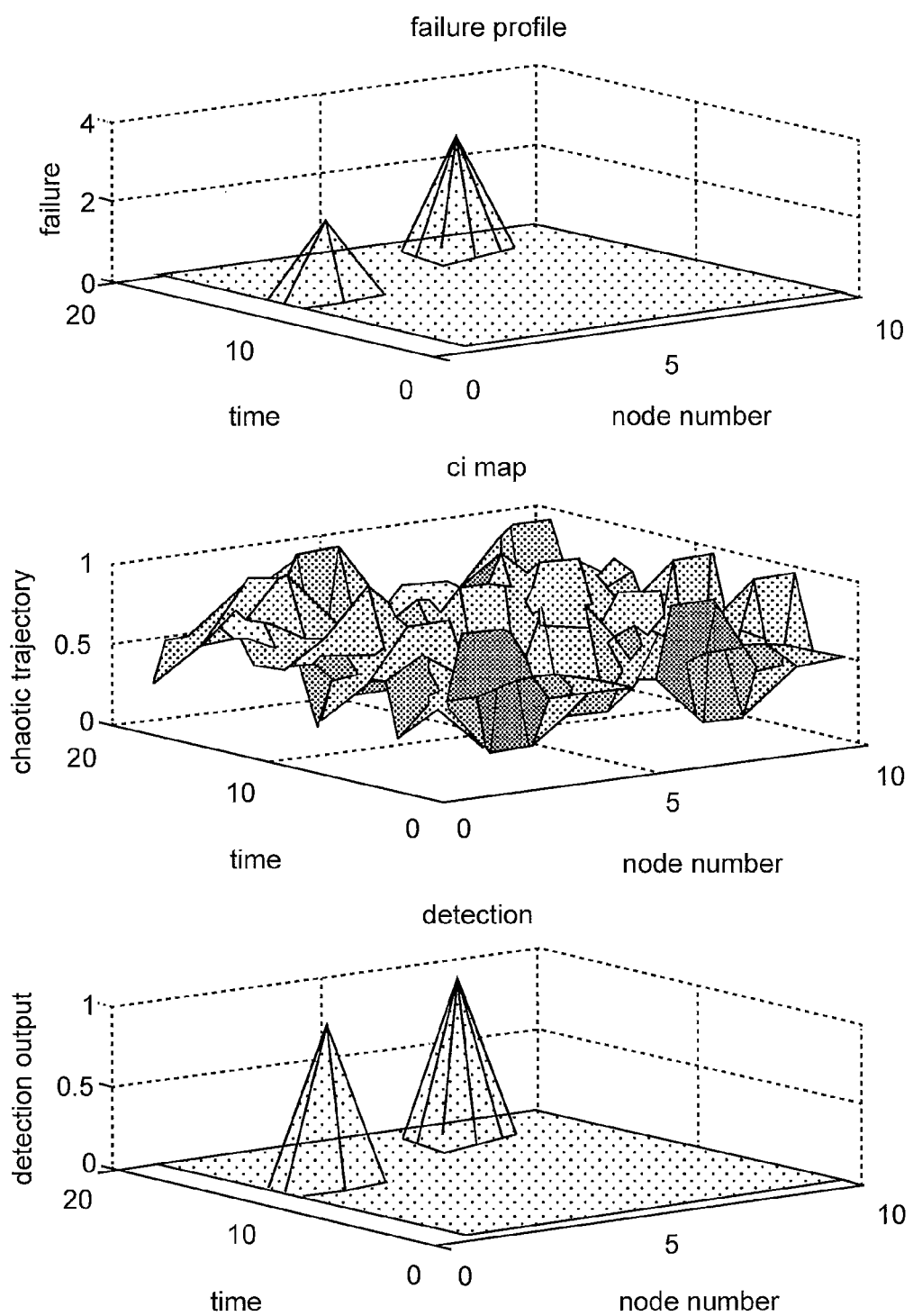
FIG. 13 shows the detection of transient failures.

A summary of illustrative results is shown for N=10 in FIGS. 10-13, where the X-axis corresponds to the computing node number and the Y-axis corresponds to time steps. In each of FIGS. 10-13, the top plot shows the time and location of the fault, the middle plot shows the trajectories of the PCC-chains within the pipeline, and the bottom plot shows the output of the fault detection system. In FIG. 10 no faults occur, and none are detected since all of the chaotic time traces of 10-node pipeline of depth k=10 are identical across the nodes. In FIGS. 11 and 12 the test systems developed an ALU fault at time step 12 at node 1, and memory stuck-at fault at node 6 at time step 16. In FIG. 11, the full pipeline, spanning all 10 nodes, detects the fault within one time step as shown in the bottom plot. In FIG. 12, the pipeline consists of a single chain which is executed one node at time, but the chain "sweeps" across the nodes in time. While both faults are detected, their detection is delayed until the chain reaches a failing node. The total computational cost in FIG. 12 is 1/10 of the cost of FIG. 13, while ensuring the detection, albeit delayed by a few time steps. FIG. 13 illustrates the detection of a transient fault, where the fault in the interconnect payload lasted for one time unit. While a full pipeline spanning all nodes detects such failure, in this case a pipeline of two chains with periodicity of 5 detects it.

The methods, devices, systems, and logic described above may be implemented in many different ways in many different combinations of hardware, software or both hardware and software. For example, all or parts of the system may diagnose circuitry in one or more controllers, one or more microprocessors (CPUs), one or more signal processors (SPU), one or more graphics processors (GPUs), one or more application specific integrated circuit (ASIC), one or more programmable media or any and all combinations of such hardware. All or part of the logic described above may be implemented in software as instructions for execution by multi-core processors (e.g., CPUs, SPUs, and/or GPUs), controller, or other processing device including exascale computers and compute clusters, and may be displayed through a display driver in communication with a remote or local display, or stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The failure detection systems may evaluate processors (e.g., CPUs, SPUs, GPUs, etc.), memory, interconnect shared and/or distributed among multiple system components, such as among multiple processors and memories, including multiple distributed processing systems. Parameters, databases, mapping software and other data structures used to evaluate and analyze these systems may be separately stored and managed, may be incorporated into a single memory or database, may be logically and/or physically organized in many different ways, and may implemented in many ways, including data structures such as linked lists, hash tables, or implicit storage mechanisms. Programs may be parts (e.g., subroutines) of a single program, separate programs, application program or programs distributed across several memories and processor cores and/or processing nodes, or implemented in many different ways, such as in a library, such as a shared library. The library may store diagnostic or failure detection software code that performs any of the system processing described herein. While various embodiments have been described, it will be apparent to those of ordinary skill in the art that many more embodiments and implementations are possible.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The abbreviation "ALU" may comprise a component within a processor configured for arithmetic, comparative, and logical functions. The term "substantially" or "about" may encompass a range that is largely, but not necessarily wholly, that which is specified. It encompasses all but a significant amount. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A failure detection system comprising:
   an exascale machine comprising a supercomputer or a cluster capable of executing at least one exaFLOPS;
   a plurality of processors that comprise part of the exascale machine programmed to execute a programming thread that generates one or more chaotic map trajectories;
   where at least one of the plurality of processors is further programmed to detect a component failure through an automated comparison of signal trajectories generated by a plurality of chaotic maps; and
   where processing threads are inserted into application code that traces the execution paths of at least one tracer code.

2. The failure detection system of claim 1 where at least one of the plurality of processors is programmed to transmit a state variable across an interconnect.

3. The failure detection system of claim 1 where the trajectories are generated by a chaotic Poincare map.

4. The failure detection system of claim 1 where the at least one of the processors detects a component failure by a comparison of a plurality of chaotic Poincare maps.

5. The failure detection system of claim 1 where the at least one of the processors detects a component failure through a difference calculation of chaotic map trajectories.

6. The failure detection system of claim 1 where the plurality of processors comprise a plurality of single or multi-core central processor units.

7. The failure detection system of claim 1 where the plurality of processors comprise a plurality of graphical processor units.

8. A failure detection system comprising:
   an exascale machine comprising a supercomputer or a cluster capable of executing at least one exaFLOPS;
   a plurality of processors that comprise part of the exascale machine programmed to execute a programming thread that generates one or more chaotic map trajectories;
   where at least one of the plurality of processors is further programmed to detect a component failure through an automated comparison of signal trajectories generated by a plurality of chaotic maps:,
   where at least one of the plurality of processors is programmed to detect component failures through the execution of inverse-pair operations.

9. A failure detection system comprising:
   an exascale machine comprising a supercomputer or a cluster capable of executing at least one exaFLOPS;
   a plurality of processors that comprise part of the exascale machine programmed to execute a programming thread that generates one or more chaotic map trajectories;
   where at least one of the plurality of processors is further programmed to detect a component failure through an automated con comparison of signal trajectories generated by a plurality of chaotic maps:
   where the plurality of processors render a plurality of pipeline chains.

10. A failure detection system comprising:
    an exascale machine comprising a supercomputer or a cluster capable of executing at least one exaFLOPS;
    a plurality of processors that comprise art of the exascale machine program to execute a programming thread that generates one or more chaotic map trajectories;
    where at least one of the plurality of processors is further to programmed to detect a component failure through an automated comparison of signal trajectories generated by a plurality of chaotic maps;
    where trajectories are generated by identity maps.

11. A failure detection system comprising:
    an exascale machine comprising a supercomputer or a cluster capable of executing at least one exaFLOPS;
    a plurality of processors that comprise part of the exascale machine programmed to execute a programming thread that generates one or more chaotic map trajectories;
    where at least one of the plurality of processors is further programmed to detect a component failure through an automated comparison of signal trajectories generated by a plurality of chaotic maps; and
    where the trajectories are generated by a chaotic Poincare map and an identity map.

12. A failure detection system comprising:
    an exascale machine comprising supercomputer or a cluster capable of executing at least one exaFLOPS;
    a plurality of processors that comprise part of the exascale machine programmed to execute a programming thread that generates one or more chaotic map trajectories;
    where at least one of the plurality of processors is further programmed to detect a component failure through an automated comparison of signal trajectories generated by a plurality of chaotic maps; and
    where the chaotic map comprises a Poincare logistic map.

13. A failure detection system comprising:
    an exascale machine comprising a supercomputer or a cluster capable of executing at least one exaFLOPS;
    a plurality of processors that comprise part of the exascale machine programmed to execute a programming thread that generates one or more chaotic map trajectories;
    where at least one of the plurality of processors is further rammed to detect a component failure through an automated comparison of signal trajectories generated by a plurality of chaotic maps; and
    where the chaotic map comprises a Poincare tent map.

14. A failure detection system comprising:
    an exascale machine comprising a supercomputer or a cluster capable of executing at least one exaFLOPS;
    a plurality of processors that comprise part of the exascale machine programmed to execute a programming thread that generates one or more chaotic map trajectories;
    where at least one of the plurality of processors is further programmed to detect a component failure through an automated comparison of signal trajectories generated by a plurality of chaotic maps; and
    where the chaotic map comprises a Poincare Henon map.

15. A programmable media comprising:
    a single or multi-core central processing unit or a graphical processing unit, capable of independent operation in an exascale machine in communication with a memory element and an interconnect that couples computing elements;
    at least one logical unit configured to execute arithmetic, comparative functions, and logical functions;
    the central processing unit or graphical processing unit configured to detect one or more computing node or interconnect failures through programming threads that generate one or more chaotic map trajectories and being configured to detect a computing node failure or an interconnect failure through an automated comparison of signal trajectories generated by the one or more chaotic maps;
    where the single or multi-core central processing unit or graphical processing unit is programmed to render a plurality of pipeline chains.

16. The programmable media of claim 15 where the central processing unit or graphical processing unit is programmed to transmit a state variable across an interconnect.

17. The programmable media of claim 15 where the trajectories comprise a chaotic Poincare map.

18. A programmable media comprising:
a single or multi-core central processing unit or a graphical processing unit, capable of independent operation in an exascale machine in communication with a memory element and an interconnect that couples computing elements;
at least one logical unit configured to execute arithmetic, comparative functions, and logical functions;
the central processing unit or graphical processing unit configured to detect one or more computing node or interconnect failures through programming threads that generate one or more chaotic map trajectories and being configured to detect a computing node failure or an interconnect failure through an automated comparison of signal trajectories generated by the one or more chaotic maps; and
where the single or multi-core central processing unit or graphical processing unit is programmed to detect the computing node failure and the interconnect failure through the execution of inverse-pair operations.

19. A. programmable media comprising:
a single or multi-core central processing unit or a graphical processing unit, capable of independent operation in an exascale machine in communication with a memory element and an interconnect that couples computing elements;
at least one logical unit configured to execute arithmetic, comparative functions, and logical functions;
the central processing unit or graphical processing unit configured to detect one or more computing node or interconnect failures through programming threads that generate one or more chaotic map trajectories and being configured to detect a computing node failure or an interconnect failure through an automated comparison of signal trajectories generated by the one or more chaotic map;
where the central processing unit or graphical processing unit is configured to execute tracer threads inserted into application code that generates the execution paths of at least one tracer code.

* * * * *

UNITED STATES PATENT AND TRADEMARK OFFICE
CERTIFICATE OF CORRECTION

| | | |
|---|---|---|
| PATENT NO. | : 9,122,603 B2 | Page 1 of 1 |
| APPLICATION NO. | : 13/919601 | |
| DATED | : September 1, 2015 | |
| INVENTOR(S) | : Nageswara S. Rao | |

It is certified that error appears in the above-identified patent and that said Letters Patent is hereby corrected as shown below:

In the Claims

In column 7, line 53, claim 9, after "automated" delete "con".

In column 7, line 60, claim 10, after "that comprise" replace "art" with --part--.

In column 7, line 61, claim 10, after "machine" replace "program" with --programmed--.

In column 7, line 63, claim 10, after "is further" delete "to".

Signed and Sealed this
Nineteenth Day of January, 2016

Michelle K. Lee
*Director of the United States Patent and Trademark Office*